United States Patent
Koue

(10) Patent No.: US 10,455,473 B2
(45) Date of Patent: Oct. 22, 2019

(54) WIRELESS COMMUNICATION

(71) Applicant: FUJI XEROX CO., LTD., Tokyo (JP)

(72) Inventor: Toshiaki Koue, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 24 days.

(21) Appl. No.: 15/812,418

(22) Filed: Nov. 14, 2017

(65) Prior Publication Data

US 2018/0288669 A1   Oct. 4, 2018

(30) Foreign Application Priority Data

Mar. 29, 2017  (JP) ................. 2017-064912

(51) Int. Cl.

| | |
|---|---|
| *H04W 36/30* | (2009.01) |
| *H04W 36/06* | (2009.01) |
| *H04W 36/14* | (2009.01) |
| *H04N 1/333* | (2006.01) |
| *H04N 1/327* | (2006.01) |

(52) U.S. Cl.
CPC ........ *H04W 36/30* (2013.01); *H04N 1/32797* (2013.01); *H04N 1/33323* (2013.01); *H04N 1/33361* (2013.01); *H04N 2201/006* (2013.01); *H04N 2201/0055* (2013.01); *H04N 2201/0094* (2013.01); *H04W 36/06* (2013.01); *H04W 36/14* (2013.01)

(58) Field of Classification Search
CPC ... H04W 84/12; H04W 36/00–36/385; H04W 72/02; H04W 72/0453; H04W 72/04; H04W 72/048; H04W 72/0493; H04W 72/06; H04W 72/08; H04W 72/10
See application file for complete search history.

(56) References Cited

U.S. PATENT DOCUMENTS

| | | | |
|---|---|---|---|
| 2012/0008510 A1* | 1/2012 | Cai ................. | H04B 7/0404 370/252 |
| 2013/0148529 A1* | 6/2013 | Stacey ............ | H04W 24/00 370/252 |
| 2018/0077617 A1* | 3/2018 | Xue ................ | H04W 36/06 |

FOREIGN PATENT DOCUMENTS

| | | |
|---|---|---|
| JP | 2006-080782 A | 3/2006 |
| JP | 2010-232724 A | 10/2010 |

* cited by examiner

*Primary Examiner* — Robert C Scheibel
(74) *Attorney, Agent, or Firm* — Oliff PLC

(57) ABSTRACT

An information processing apparatus includes a communication unit, a first switching unit, and a second switching unit. The communication unit is configured to conduct a wireless communication using a plurality of transmission methods, one of which has plural channels. The first switching unit switches between the transmission methods according to quality of a communication that is being conducted. The second switching unit switches between the channels when the first switching unit could not switch between the transmission methods.

10 Claims, 12 Drawing Sheets

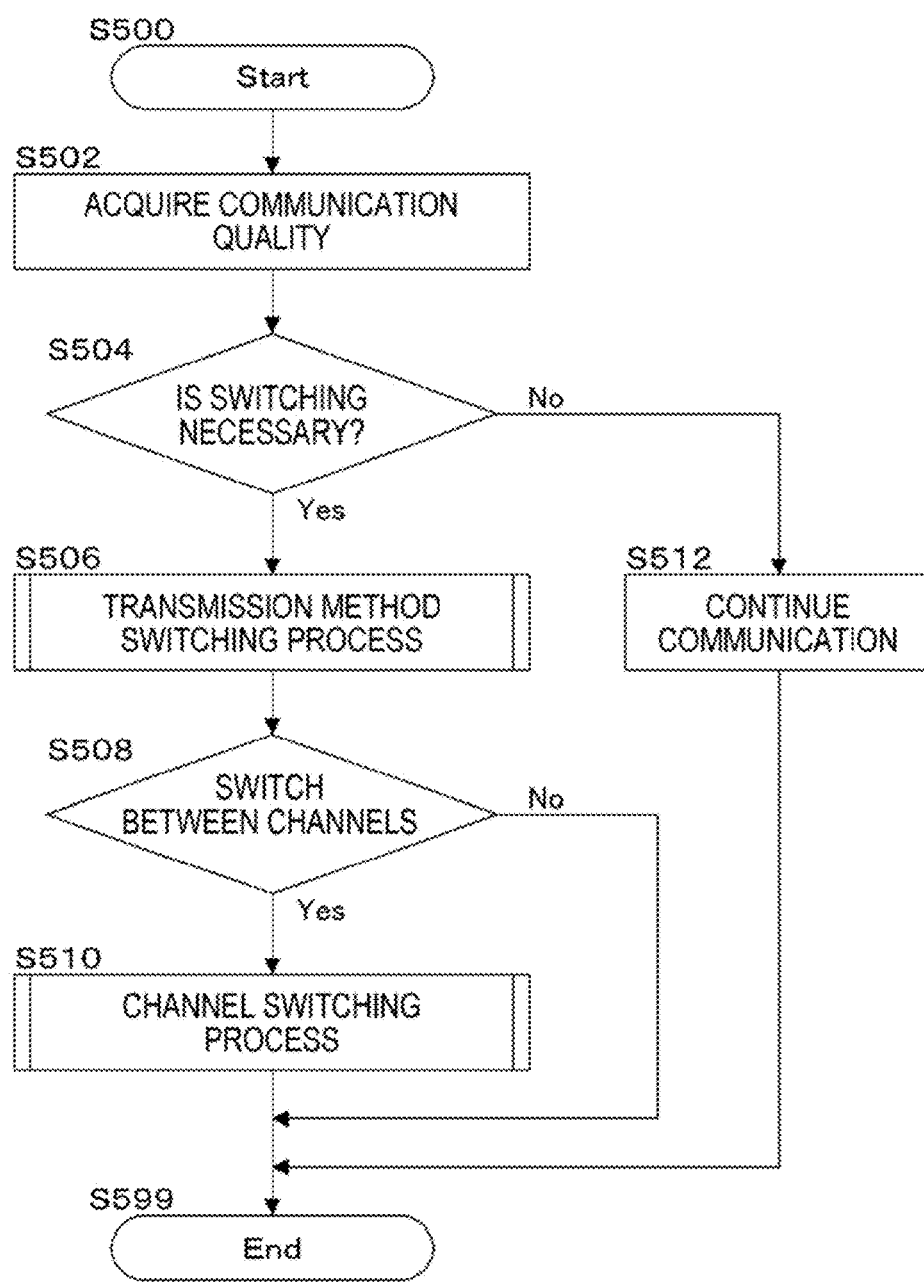

FIG.7

| TRANSMISSION METHOD | IN-USE | USED |
|---|---|---|
| 802.11b | | ○ |
| 802.11a | ○ | ○ |
| 802.11g | | ○ |
| 802.11n | ○ | |
| 802.11ac | | |
| 802.11ad | ○ | |
| BLUETOOTH | | |

WIRELESS COMMUNICATION

CROSS-REFERENCE TO RELATED APPLICATIONS

This application is based on and claims priority under 35 USC 119 from Japanese Patent Application No. 2017-064912 filed Mar. 29, 2017.

BACKGROUND

Technical Field

The present invention relates to an information processing apparatus and a non-transitory computer readable storage medium.

SUMMARY

According to an aspect of the invention, an information processing apparatus includes a communication unit, a first switching unit, and a second switching unit. The communication unit configured to conduct a wireless communication using a plurality of transmission methods, one of which has plural channels. The first switching unit switches between the transmission methods according to quality of a communication that is being conducted. The second switching unit switches between the channels when the first switching unit could not switch between the transmission methods.

BRIEF DESCRIPTION OF THE DRAWINGS

Exemplary embodiments of the present invention will be described in detail based on the following figures, wherein:

FIG. 5 is a flowchart illustrating an exemplary process by the exemplary embodiment;

FIG. 7 is an explanatory view illustrating an exemplary data structure of a transmission method use table;

DETAILED DESCRIPTION

Hereinafter, an exemplary embodiment suitable for implementing the present invention will be described with reference to the accompanying drawings.

Figure 1:
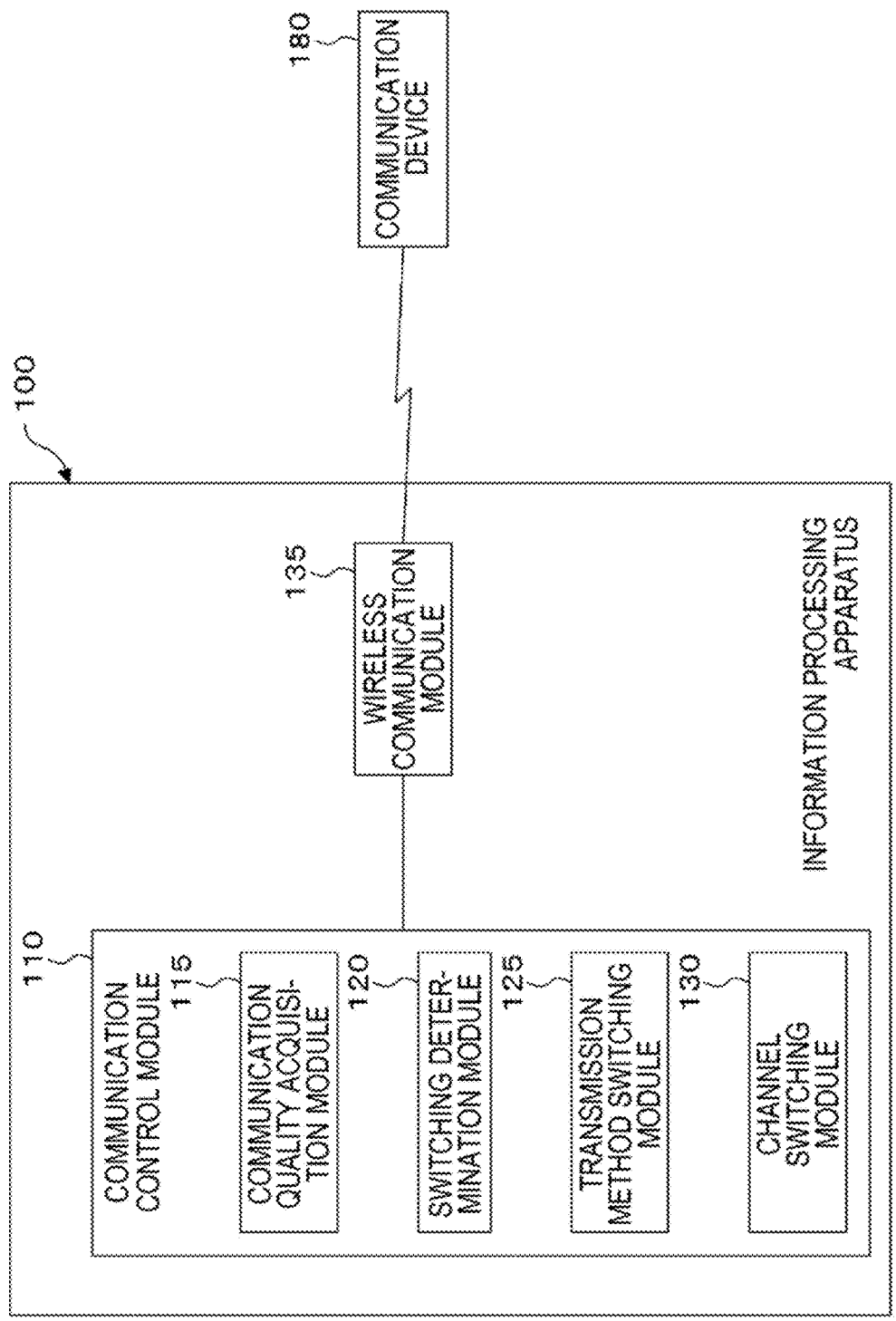
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For the convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 according to the present exemplary embodiment conducts a wireless communication, and includes a communication control module 110 and a wireless communication module 135 as illustrated in the example of FIG. 1.

A communication device 180 is connected to the wireless communication module 135 of the information processing apparatus 100 via a communication line. The communication device 180 is capable of conducting a wireless communication and is, for example, a mobile information terminal, a notebook PC, or an access point. There may be provided multiple communication devices 180 that are capable of conducting a wireless communication with the information processing apparatus 100.

The wireless communication module 135 is connected to the communication control module 110 and also connected to the communication device 180 via a communication line. The wireless communication module 135 is capable of conducting a wireless communication using multiple transmission methods. Further, the wireless communication module 135 is capable of conducting a wireless communication with multiple communication devices 180. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 135 has multiple channels (wireless communication paths). Of course, each of all the transmission methods may have multiple channels.

The transmission methods by which the wireless communication module 135 is capable of conducting a wireless communication may include at least the communication standard of IEEE802.11ad.

The communication control module 110 includes a communication quality acquisition module 115, a switching determination module 120, a transmission method switching module 125, and a channel switching module 130. The communication control module 110 is connected to the wireless communication module 135. The communication control module 110 controls the wireless communication between the information processing apparatus 100 and the communication device 180.

The communication quality acquisition module 115 acquires the quality of a communication that is being conducted using the wireless communication module 135. Here, the "quality of a communication" (communication quality) includes a transmission quality, a connection quality, and a stability quality. For example, the "quality of a communication" includes a communication speed (for example, delay and responsiveness), stability (for example, data loss rate and reliability), a coverage range and the like, and specifically corresponds to detecting a reception level of a radio signal, an occurrence of disconnection of a wireless communication during the communication, and the like.

The switching determination module 120 determines whether to switch the communication that is being conducted by the wireless communication module 135, based on the communication quality acquired by the communication quality acquisition module 115. The switching is performed when the communication quality is deteriorated. For example, if the reception level of a radio signal acquired by the communication quality acquisition module 115 is lower than a predetermined threshold value, switching by the transmission method switching module 125 or the channel switching module 130 is performed. In addition, if the communication quality acquisition module 115 detects disconnection of a wireless communication (or if the number of times of the disconnection is larger than a predetermined threshold value or if disconnection time is longer than a predetermined time), switching by the transmission method switching module 125 or the channel switching module 130 is performed.

The transmission method switching module 125 switches between the transmission methods according to the quality of the communication that is being conducted using the wireless communication module 135. Here, the description of "according to the quality of the communication that is being conducted" corresponds to, for example, (i) a case where the reception level of a radio signal from the communication device 180 as a communication counterpart is low, (ii) a case where a communication is disconnected during the communication, or the like. "Switching between the transmission methods" includes, for example, switching from IEEE802.11b to IEEE802.11n. In addition, the switching may be switching from one frequency band to another frequency band. For example, the switching may switch from a transmission method of 2.4 GHz to a transmission method of 5 GHz. That is, switching between the transmission methods within the same frequency band may not be performed.

In addition, the transmission method switching module 125 may switch between the transmission methods when the number of times of the switching is less than or equal to or less than a predetermined value.

In addition, the transmission method switching module 125 may switch a transmission method to a transmission method different from an already selected transmission method.

In addition, the transmission method switching module 125 may switch a transmission method to IEEE802.11ad.

In addition, the transmission method switching module 125 may switch to a predetermined transmission method and a predetermined channel. It should be noted that the "predetermined transmission method and the predetermined channel" may include predetermined multiple transmission methods and predetermined multiple channels. In this case, the predetermined multiple transmission methods and the predetermined multiple channels may be displayed as multiple selection options so that an operator is selectable. In addition, priorities may be set.

In addition, the transmission method switching module 125 may determine the "predetermined transmission method and the predetermined channel" when the information processing apparatus 100 is installed.

The channel switching module 130 switches between channels when the transmission method switching module 125 could not switch between the transmission methods. Here, "switching between channels" includes, for example, changing a frequency.

In addition, if the number of times of the switching by the transmission method switching module 125 is larger than or equal to or larger than a predetermined value, the switching by the channel switching module 130 may be performed.

In addition, if the transmission method switching module 125 could not select a transmission method different from an already selected transmission method, the switching by the channel switching module 130 may be performed.

Figure 2A:
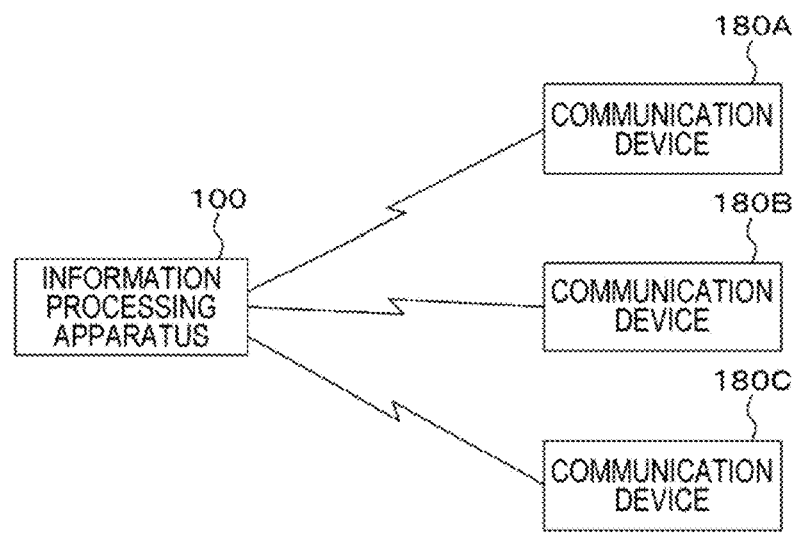
FIGS. 2A and 2B are explanatory views illustrating an exemplary system configuration using the exemplary embodiment.
Figure 2B:
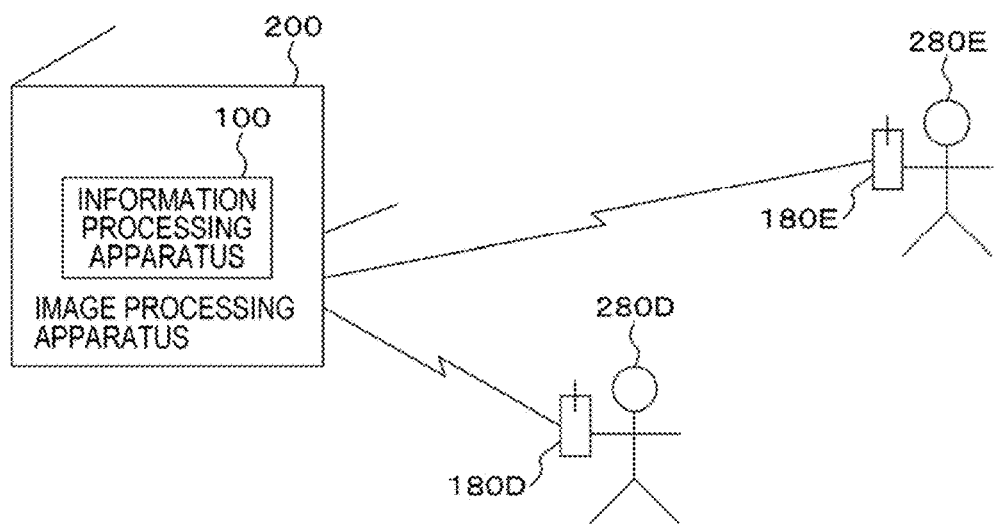

FIGS. 2A and 2B are explanatory views illustrating an exemplary system configuration using the present exemplary embodiment.

As illustrated in the example of FIG. 2A, the information processing apparatus 100 conducts a wireless communication with multiple communication devices 180 (communication devices 180A, 180B, and 180C). The wireless communication is conducted by a transmission method enabling the mutual communication between the information processing apparatus 100 and the communication devices 180. A channel is determined according to a predetermined algorithm at the time of starting the communication.

In the wireless communication, the communication quality may change during the communication. For example, the communication quality may change due to a usage environment, a congestion status, a malfunction, and the like. More specifically, the communication quality may change due to movement of an obstacle for a wireless communication (for example, an automobile, opening/closing of a door, and persons), movement of the information processing apparatus 100 or the communication devices 180 (for example, movement of the owner of the information processing apparatus 100 or the communication devices 180 when the information processing apparatus 100 or the communication devices 180 are mobile devices), use of another device (for example, a microwave oven and other communication devices), and traffics.

In the information processing apparatus 100 of the present exemplary embodiment, if the quality of the communication that is being conducted is deteriorated, the switching is performed in an order of a transmission method and a channel, for better communication quality.

As illustrated in the example of FIG. 2B, an image processing apparatus 200 may have the information processing apparatus 100.

The image processing apparatus 200 is capable of conducting a wireless communication with a communication device 180D of a user 280D and a communication device 180E of a user 280E.

For example, the user 280D transmits a printing instruction to the image processing apparatus 200 by operating the communication device 180D and gets a printed matter from the image processing apparatus 200. In addition, the user 280E transmits a scanned image to the communication device 180E to store the image in the communication device 180E, by performing a scan operation with the image processing apparatus 200.

Figure 3:
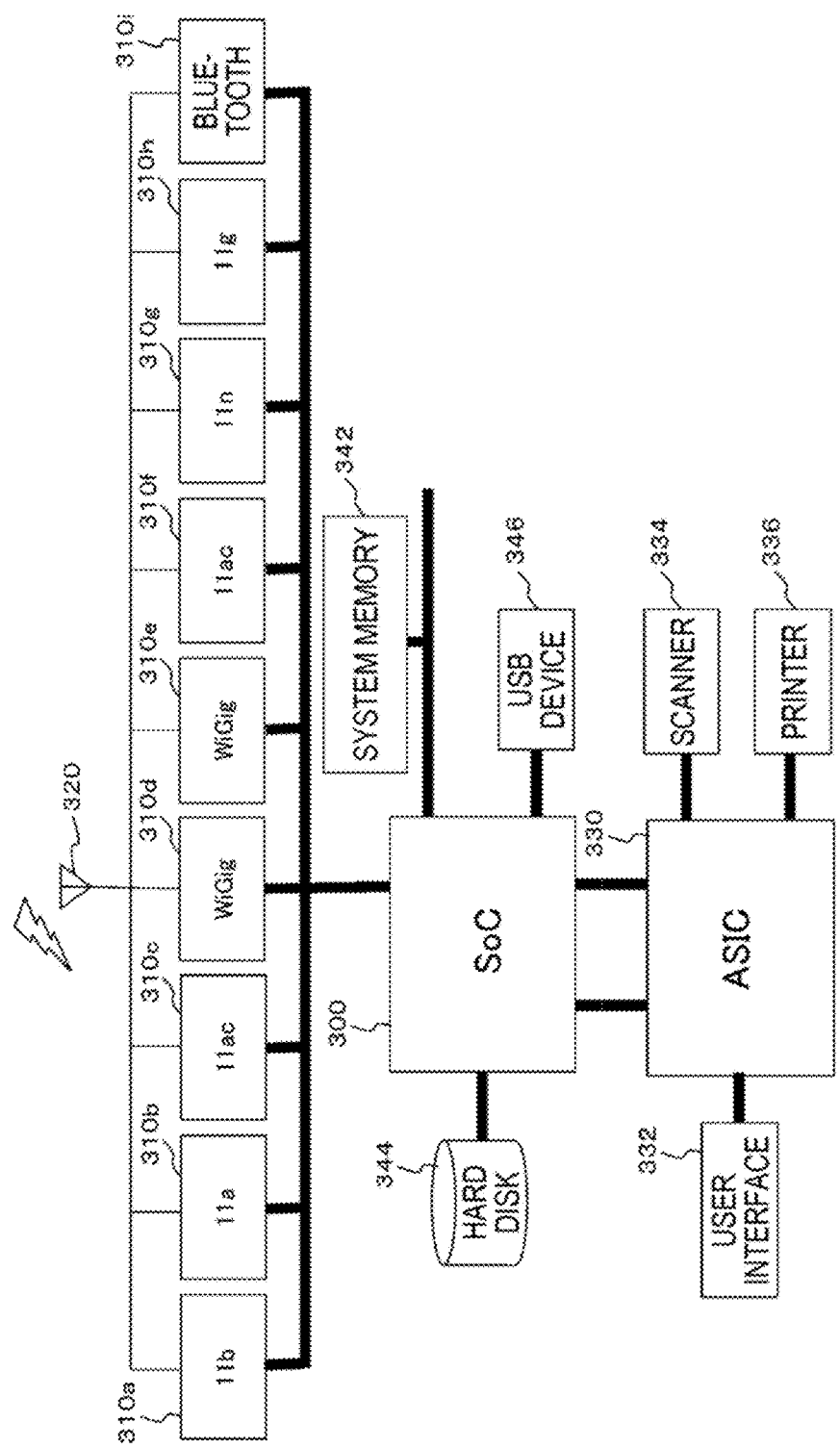
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11b:310a, 11a:310b, 11ac:310c, WiGig:310d, WiGig:310e, 11ac:310f, 11n:310g, 11g :310h, Bluetooth 310i, an antenna 320, a system memory 342, a hard disk 344, a USB device 346, an application specific integrated circuit (ASIC) 330, a user interface 332, a scanner 334, and a printer 336.

11b:310a is connected to the antenna 320 and the SoC 300. 11a:310b is connected to the antenna 320 and the SoC 300. 11ac:310c is connected to the antenna 320 and the SoC 300. WiGig:310d is connected to the antenna 320 and the SoC 300. WiGig:310e is connected to the antenna 320 and the SoC 300. 11ac:310f is connected to the antenna 320 and the SoC 300. 11n:310g is connected to the antenna 320 and the SoC 300. 11g:310h is connected to the antenna 320 and the SoC 300. Bluetooth 310i is connected to the antenna 320 and the SoC 300. The antenna 320 maybe shared. Further, multiple antennas 320 maybe provided. The combination of the communication devices (communication chips) 310 and the antenna 320 is an example implementing the wireless communication modules 135 illustrated in the example of FIG. 1. 11b:310a to 11g:310h comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802. 11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310i other than the "IEEE802.11 standard" may be used.

The SoC 300 is connected to 11b:310a, 11a:310b, 11ac:310c, WiGig:310d, WiGig:310e, 11ac:310f, 11n:310g, 11g:310h, Bluetooth 310i, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. The hard disk 344 stores, for example, a transmission method use table 700, a channel use table 900, a channel use table 1000, and communication contents.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
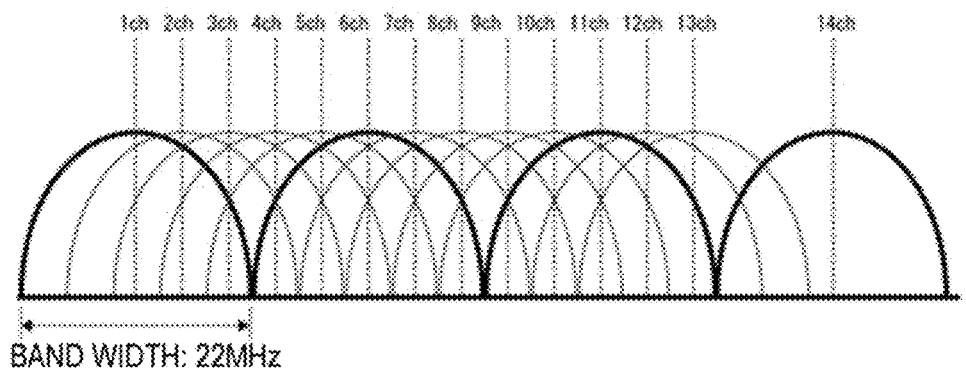
FIGS. 4A and 4B are explanatory views illustrating examples of channels.
Figure 4B:
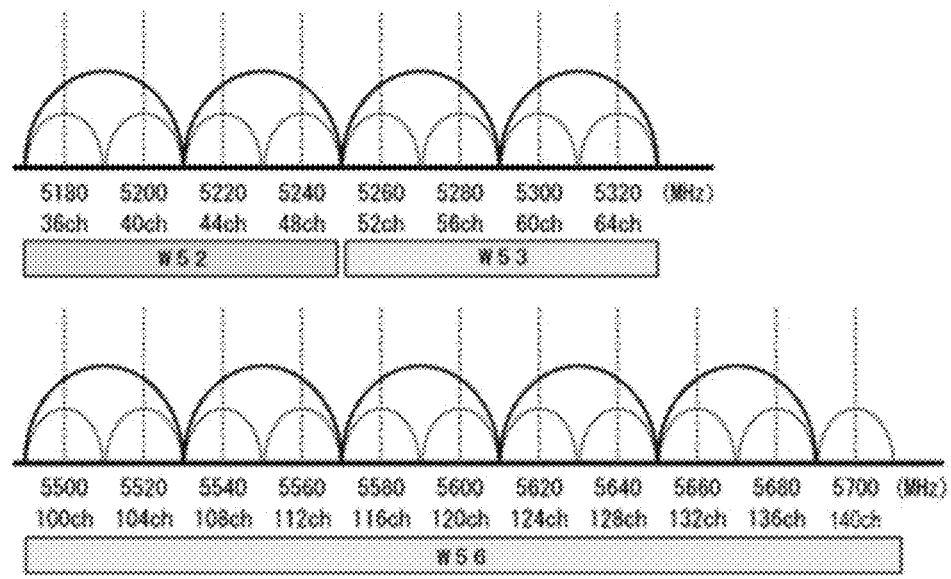

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch to another transmission method even during a communication. In addition, it may be effective to switch a channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz in Japan and Europe. The frequency band is divided into 11 channels of 1 ch to 11 ch each having the channel width of 20 MHz in the United States.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band in Japan, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present in Japan and Europe. Not illustrated in FIG. 4B, in IEEE802.11a/n/ac using the 5 GHz band, 24 channels are present in the United States. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching between the channels, a "channel bonding" function (a high speed mode) maybe included. That is, as the switching between the channels, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching between the transmission methods, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

FIG. 5 is a flowchart illustrating an exemplary process according to the present exemplary embodiment (information processing apparatus 100).

In step S502, the communication quality acquisition module 115 acquires the communication quality. The communication quality acquisition module 115 acquires the communication quality during the communication based on a signal received from the communication device 180 as a counterpart device. For example, as described above, the communication quality acquisition module 115 detects a reception level of a radio signal, an occurrence of disconnection of a wireless communication during the communication, and the like.

In step S504, the switching determination module 120 determines whether the switching is necessary. If it is determined that the switching is necessary, the process proceeds to step S506. Otherwise, the process proceeds to step S512. That is, it is determined whether (i) to continue the communication as it is or (ii) to change a transmission method and conduct a communication again (whether to conduct a communication from the connection again).

In step S506, the transmission method switching module 125 performs a transmission method switching process. The detailed process of step S506 will be described later using the flowchart illustrated in an example of FIG. 6.

In step S508, the channel switching module 130 determines whether to switch between the channels. If it is determined to switch between the channels, the process proceeds to step S510. Otherwise, the communication using the new transmission method is continued.

In step S510, the channel switching module 130 performs a channel switching process. The detailed process of step S510 will be described later using the flowchart illustrated in an example of FIG. 8.

In step S512, the wireless communication module 135 continues the communication by the current transmission method and the current channel.

Figure 6:
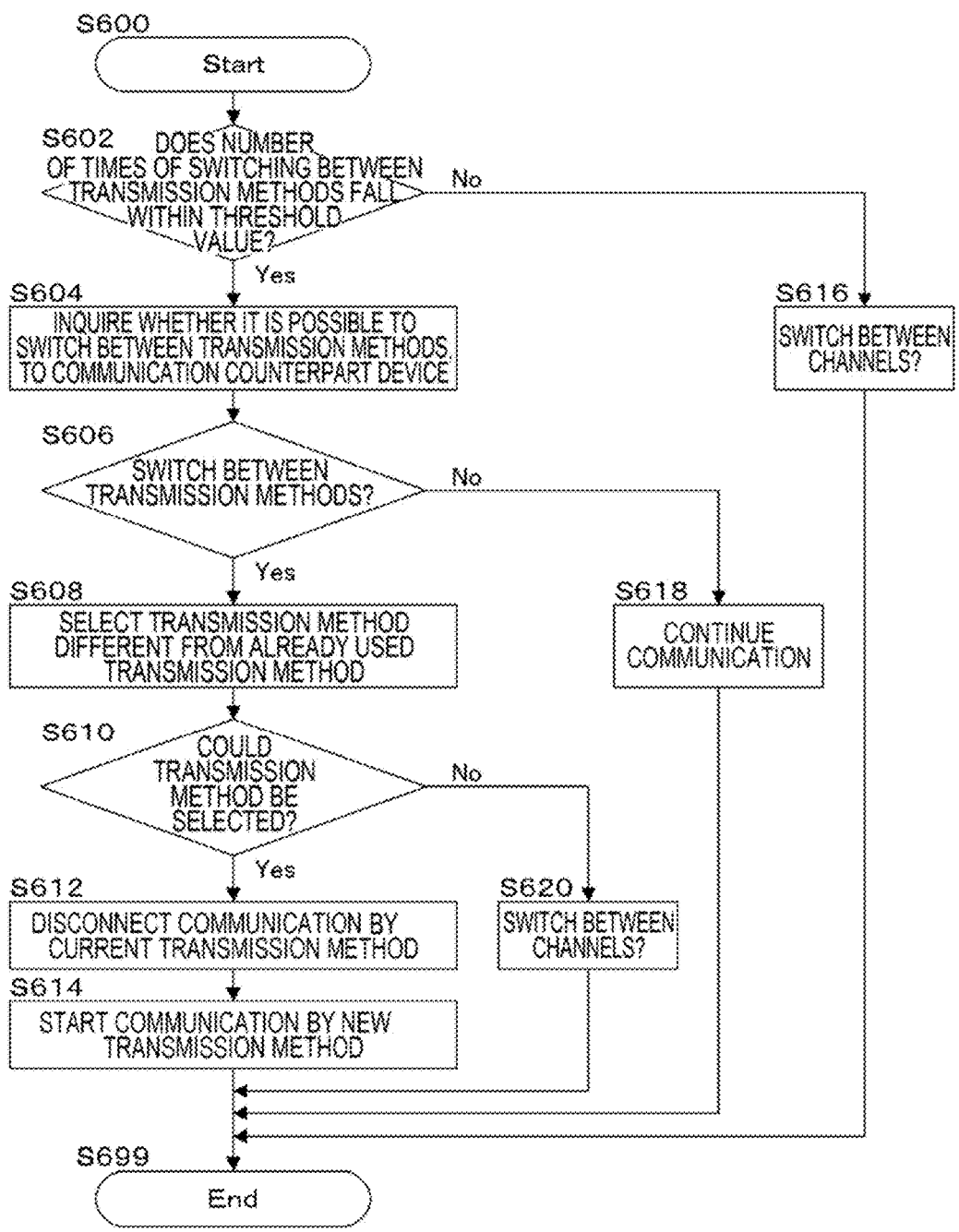
FIG. 6 is a flowchart illustrating an exemplary process by the exemplary embodiment.

FIG. 6 is a flowchart illustrating an exemplary process according to the present exemplary embodiment (the transmission method switching module 125).

In step S602, it is determined whether the number of times of switching between the transmission methods falls within a threshold value. If it is determined that the number of times of switching between the transmission methods falls within the threshold value, the process proceeds to step S604. Otherwise, the process proceeds to step S616.

In step S604, it is inquired whether it is possible to switch between the transmission methods, to the communication device 180 which is a communication counterpart device.

In step S606, it is determined whether a reply from the communication device 180 indicates switching between the transmission methods. If it is determined that the reply indicates switching between the transmission methods, the process proceeds to step S608. Otherwise, the process proceeds to step S618.

In step S608, a transmission method different from the already used transmission method is selected. For example, the different transmission method is selected using the transmission method use table 700.

FIG. 7 is an explanatory view illustrating an exemplary data structure of the transmission method use table 700. The transmission method use table 700 has a transmission method column 710, an in-use column 720, and a used column 730. The transmission method column 710 stores the transmission methods. The in-use column 720 stores whether each transmission method is currently in use. The used column 730 stores whether each transmission method was already used in a target communication. By excluding the already used transmission methods, an occurrence of an endless loop is avoided.

In FIG. 7, the mark "∘" indicates "currently in use" or "already used". Specifically, a transmission method that is not marked in the in-use column 720 and the used column 730 (a channel that is not indicated with the mark "∘") is selected.

In step S610, it is determined whether a transmission method could be selected. If it is determined that a transmission method could be selected, the process proceeds to step S612. Otherwise, the process proceeds to step S620.

In step S612, the communication by the current transmission method is disconnected.

In step S614, communication is started by the new transmission method. At this time, a communication may be newly started from the beginning. Alternatively, only the remaining communication that could not be transmitted in the communication that has been conducted until now may be conducted.

In step S616, it is determined to switch between the channels, and the process is ended (step S699). That is, in step S508 of the flowchart illustrated in the example of FIG. 5, it is determined that the answer is "Yes."

In step S618, the communication by the current transmission method is continued, and the process is ended (step S699).

In step S620, it is determined to switch between the channels, and the process is ended (step S699). That is, in step S508 of the flowchart illustrated in the example of FIG. 5, it is determined that the answer is "Yes."

Figure 8:
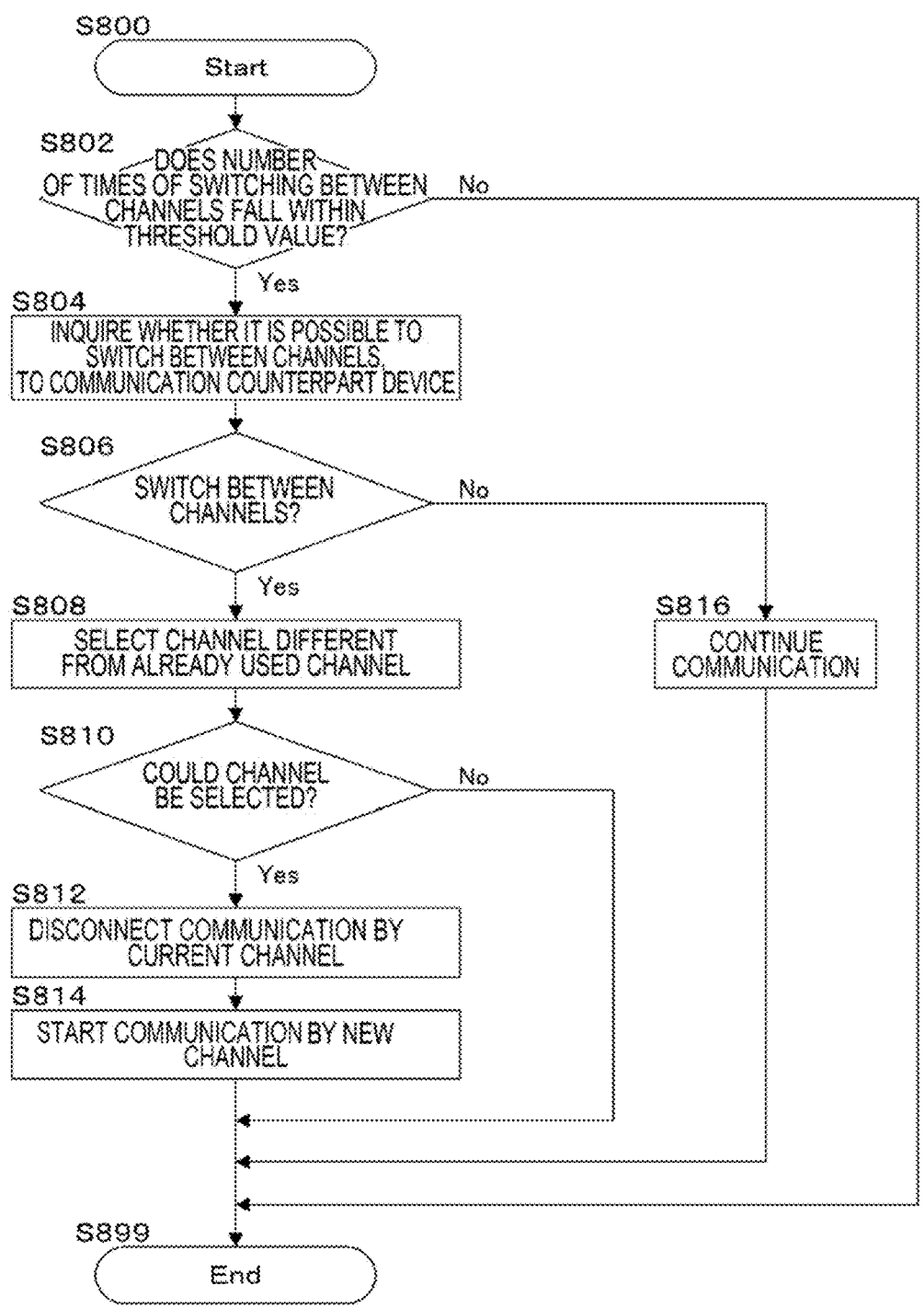
FIG. 8 is a flowchart illustrating an exemplary process by the exemplary embodiment.

FIG. 8 is a flowchart illustrating an exemplary process according to the present exemplary embodiment (the channel switching module 130).

In step S802, it is determined whether the number of times of switching between the channels falls within a threshold value. If it is determined that the number of times of switching between the channels falls within the threshold value, the process proceeds to step S804. Otherwise, the process is ended (step S899; that is, the communication is continued as it is).

In step S804, it is inquired whether it is possible to switch between the channels, to the communication device 180 which is the communication counterpart device.

In step S806, it is determined whether a reply from the communication device 180 indicates switching between the channels. If it is determined that the reply indicates switching between the channels, the process proceeds to step S808. Otherwise, the process proceeds to step S816.

In step S808, a channel different from the already used channel is selected. For example, the different channel is selected using the channel use tables 900 and 1000.

Figure 9:
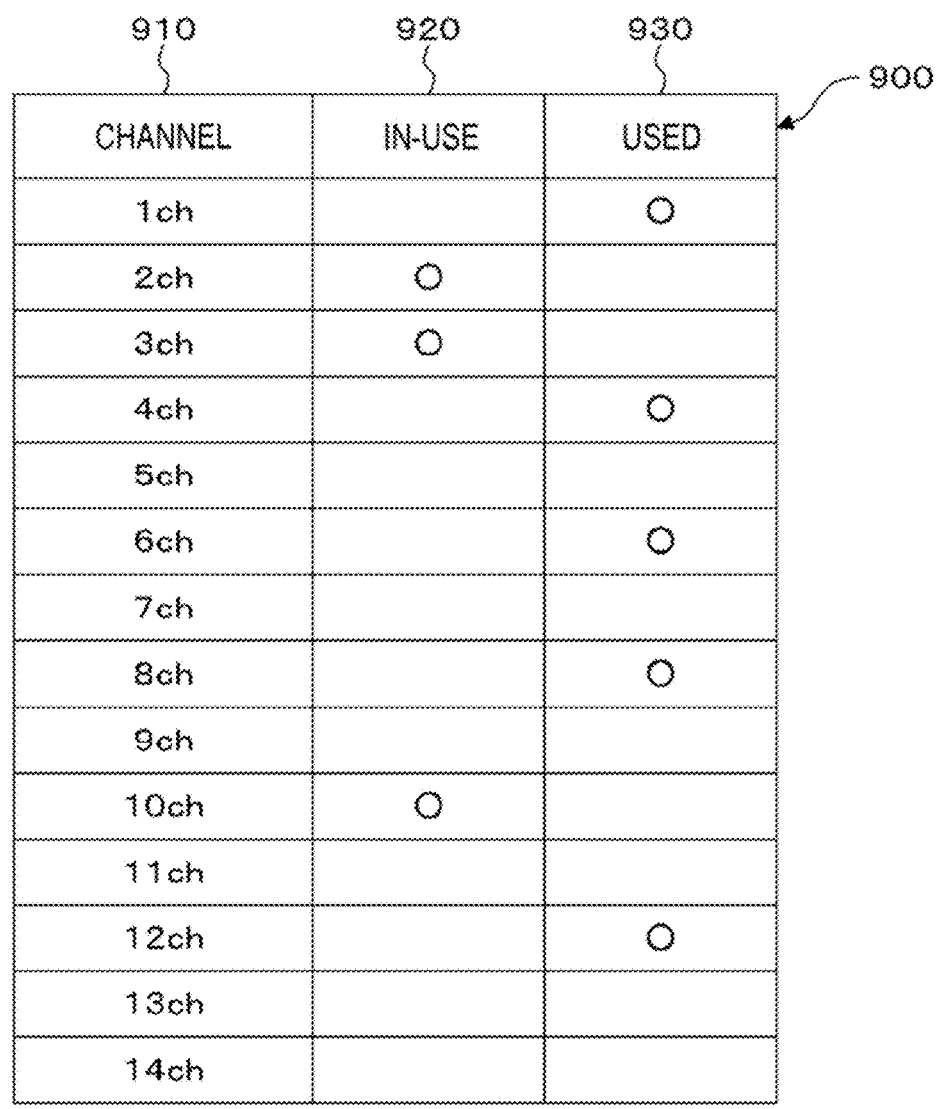
FIG. 9 is an explanatory view illustrating an exemplary data structure of a channel use table.

FIG. 9 is an explanatory view illustrating an exemplary data structure of the channel use table 900. The channel use table 900 has a channel column 910, an in-use column 920, and a used column 930. The channel use table 900 is used for the transmission method of IEEE802.11b/g/n using the frequency band of 2.4 GHz. The channel column 910 stores channels. The in-use column 920 stores whether each channel is currently in use. The used column 930 stores whether each channel was already used in a target communication. By excluding the already used channels, an occurrence of an endless loop is avoided.

In FIG. 9, the mark "∘" indicates "currently in use" or "already used". Specifically, a channel that is not marked in the in-use column 920 and the used column 930 (a channel that is not indicated with the mark "∘") is selected. In addition, as described above, a channel of a frequency band that does not overlap with a channel that is currently in use or was already used may be selected.

Figure 10:
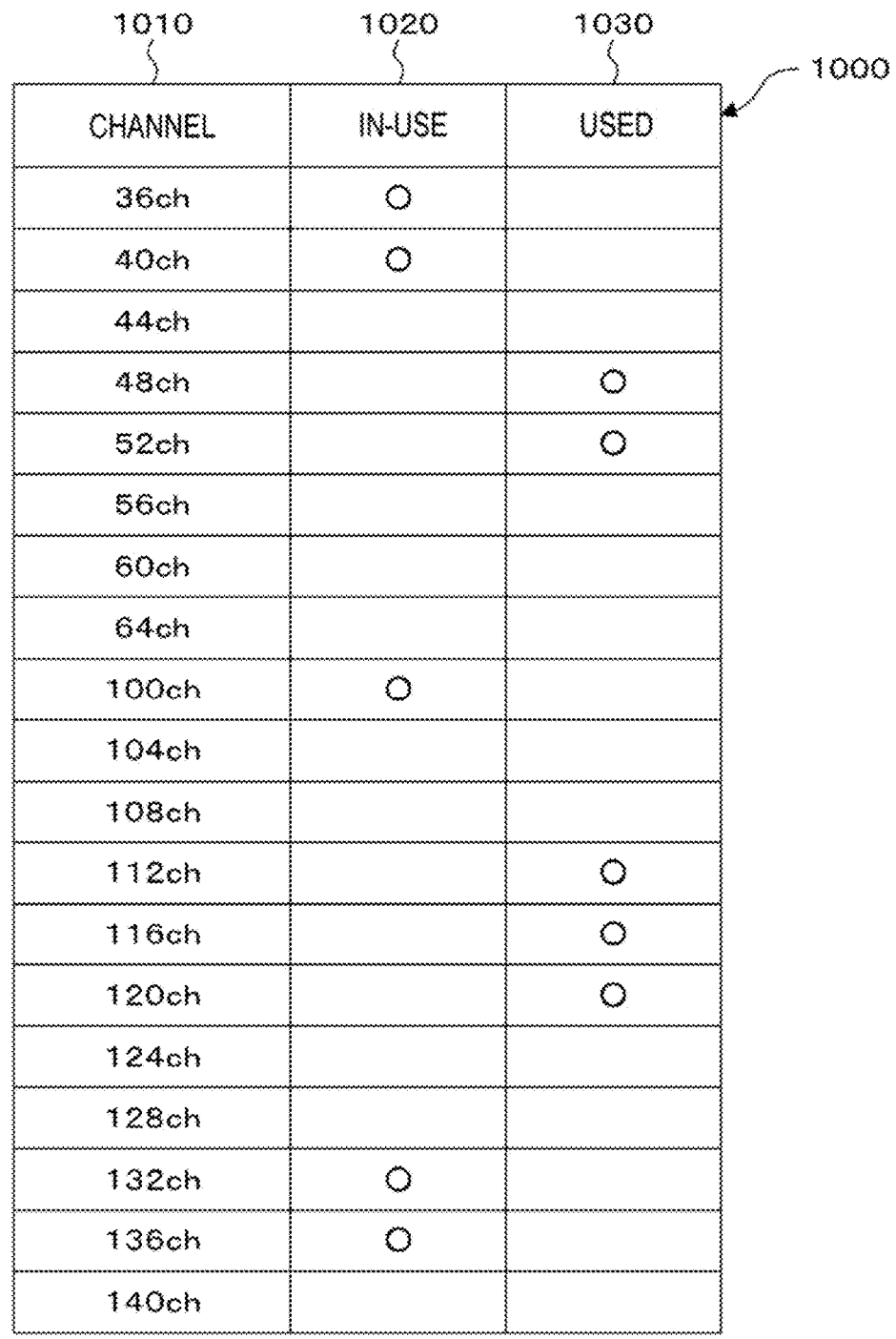
FIG. 10 is an explanatory view illustrating an exemplary data structure of a channel use table.

FIG. 10 is an explanatory view illustrating an exemplary data structure of the channel use table 1000. The channel use table 1000 has a channel column 1010, an in-use column 1020, and a used column 1030. The channel use table 1000 is used for the transmission method of IEEE802.11a/n/ac using the frequency band of 5 GHz. The channel column 1010 stores channels. The in-use column 1020 stores whether each channel is currently in use. The used column 1030 stores whether each channel was already used in a target communication. By excluding the already used channels, an occurrence of an endless loop is avoided.

In FIG. 10, the mark "∘" indicates "currently in use" or "already used". Specifically, a channel that is not marked in the in-use column 1020 and the used column 1030 (a channel that is not indicated with the mark "∘") is selected.

In step S810, it is determined whether a channel could be selected in step S808. If it is determined that a channel could be selected, the process proceeds to step S812. Otherwise, the process is ended (step S899).

In step S812, the communication by the current channel is disconnected.

In step S814, communication is started by the new channel. At this time, a communication may be newly started from the beginning. Alternatively, only the remaining communication that could not be transmitted in the communication that has been conducted until now may be conducted.

In step S816, the communication using the current channel is continued, and the process is ended (step S899).

Figure 11:
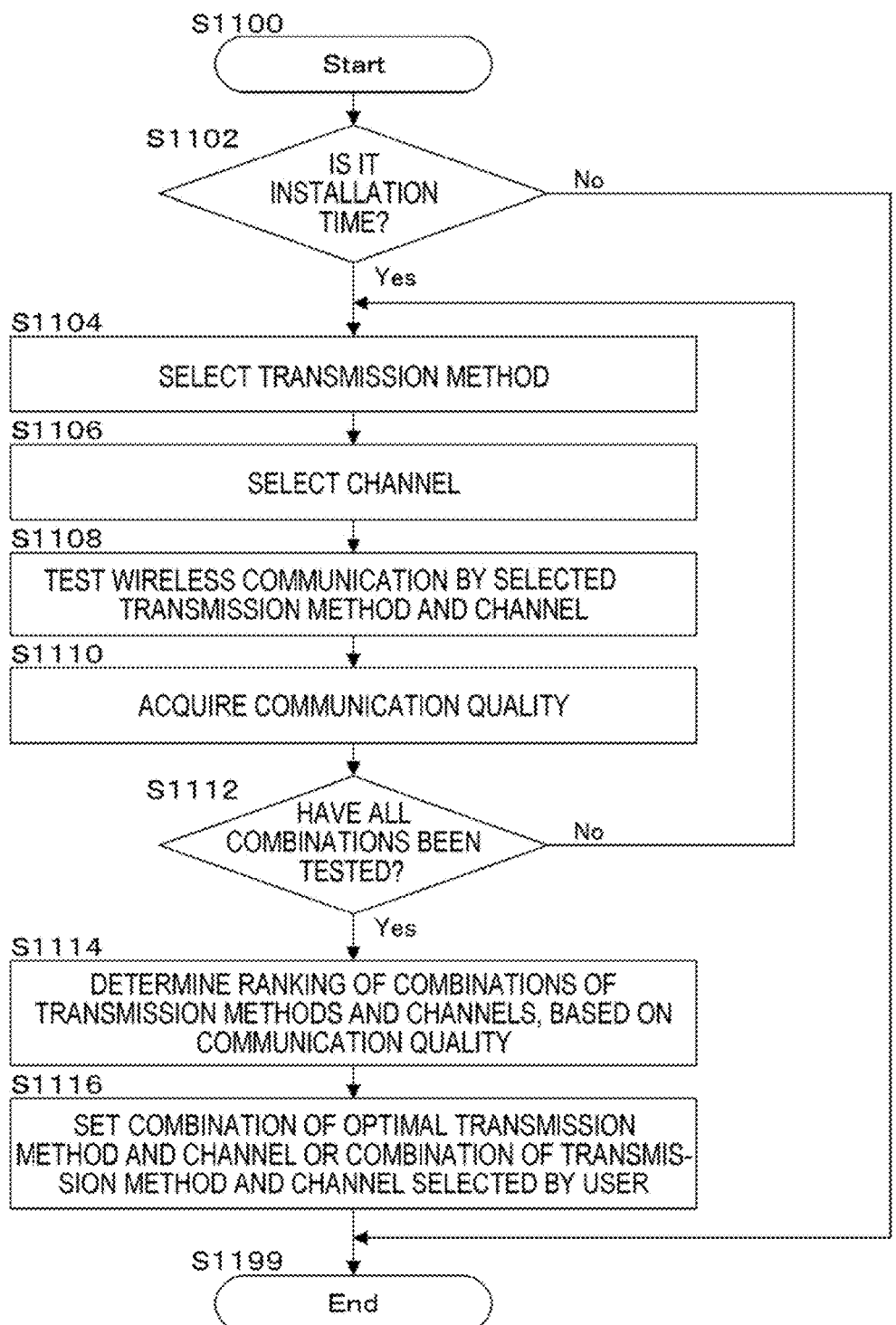
FIG. 11 is a flowchart illustrating an exemplary process by the exemplary embodiment.

FIG. 11 is a flowchart illustrating an exemplary process according to the present exemplary embodiment (the information processing apparatus 100). The following configuration may be employed. That is, the information processing apparatus 100 automatically sends a radio signal by a diagnosis function (a self-diagnosis function) of the information processing apparatus 100 when the information processing apparatus 100 is installed. The information processing apparatus 100 receives a reception signal from a counterpart device and automatically selects a combination of optimal transmission method and channel according to obtained detection data.

In step S1102, it is determined whether it is the installation time of the information processing apparatus 100 (the initial setting time). If it is determined that it is the installation time, the process proceeds to step S1104. Otherwise, the process is ended (step S1199). This is because main communication environments (place and area) are determined at the installation time of the information processing apparatus 100.

In step S1104, a transmission method is selected. An order in which a target transmission method is selected from among multiple transmission methods may be determined in advance.

In step S1106, a channel is selected. An order in which a target channel is selected from among multiple channels may be determined in advance.

In step S1108, a test wireless communication is conducted by the transmission method and the channel which are selected in steps S1104 and S1106.

In step S1110, the communication quality is acquired.

In step S1112, it is determined whether all combinations have been tested. If it is determined that all the combinations have been tested, the process proceeds to step S1114. Otherwise, the process returns to step S1104.

In step S1114, ranking of the combinations of the transmission methods and the channels is determined based on the communication quality. That is, a combination having a better communication quality ranks high.

In step S1116, a combination of an optimal transmission method and channel or a combination of a transmission method and a channel that are selected by a user is set. If there are multiple combinations of transmission methods and channels that have a higher communication quality than a predetermined value, a user may select one from the multiple combinations.

A combination of a transmission method and a channel that have a higher communication quality than the predetermined value may be used as follows:

If it is determined in step S504 of the flowchart illustrated in the example of FIG. 5 that the switching is necessary, switching may be made to this combination of the transmission method and the channel.

In the process according to the flowchart illustrated in the example of FIG. 11, an optimal transmission method or channel is determined in advance. When the information processing apparatus 100 is subjected to the initial setting (including the initial installation), a transmission method or channel optimal for the place (including the area) is investigated (including evaluation or verification) and set as an optimal transmission method. The optimal transmission method or channel is determined by automatically transmitting and receiving a radio signal, by the diagnosis function. Specifically, the optimal transmission method or channel may be determined according to detection data obtained by automatically sending a radio signal by the auto-diagnosis function and receiving a reception signal from a counterpart device. In addition, priorities may be set, displayed, and selected (corrected).

After the optimal transmission method or channel is determined in advance, when communication abnormality is detected during the communication, the transmission method maybe switched to the transmission method or channel that has been determined in advance.

Especially, when the transmission method is IEEE802.11ad, the ability of the transmission method exhibits differently depending on the installation environment (for example, the ability is low when there exist many obstacles (for example, foliage plants, bookshelves, and partitions)), and the effectiveness of the above-described information (the transmission method or channel determined at the installation time) is higher than that of other transmission methods, in performing selection at the switching time. That is, even for the same transmission method, the communication quality in a case where access is performed from a position where an obstacle or the like does not exist and the communication quality in a case where access is performed from a position where an obstacle or the like exists are different from each other.

Thus, when IEEE802.11ad is included as a transmission method, the number of times of the quality measurement may increase, as compared to that in other transmission methods. In addition, upon the quality measurement, it may be presented to attempt the quality measurement while changing the position of the information processing apparatus 100, the direction of an antenna or the like, on the display by using the graphical user interface (GUI).

In addition, the following processes may be performed at the time of use after the initial setting.

The priorities of the selection may be changed to be different between (i) a case where the information processing apparatus 100 is located at a position where no obstacle exists and (ii) other cases. For example, it is detected whether an obstacle exists using a human detection sensor, a camera or the like provided in the information processing apparatus 100. If no obstacle exists, the priority of IEEE802.11ad may be set to be high. If an obstacle exists, the priority of IEEE802.11ad may be set to be low.

In addition, if there is a variation in the quality measurement at the initial setting time, unlike other transmission methods, IEEE802.11ad may be subjected to the quality measurement at a time other than the initial setting time, for reflection on the priority of IEEE802.11ad afterward. The quality measurement may be performed, for example, every predetermined time period (so-called periodically). Alternatively, the quality measurement may be performed when an obstacle is detected by using a human detection sensor, a camera or the like provided in the information processing apparatus 100 or when switching between the transmission methods or between the channels frequently occurs (specifically, when the number of times of the switching is equal to or more than the predetermined number of times in a predetermined time period).

An exemplary hardware configuration of the information processing apparatus of the present exemplary embodiment will be described with reference to FIG. 12. The configuration illustrated in FIG. 12 is implemented with, for example, a personal computer (PC), and represents an exemplary hardware configuration provided with a data reading unit 1217 such as a scanner and a data output unit 1218 such as a printer.

Figure 12:
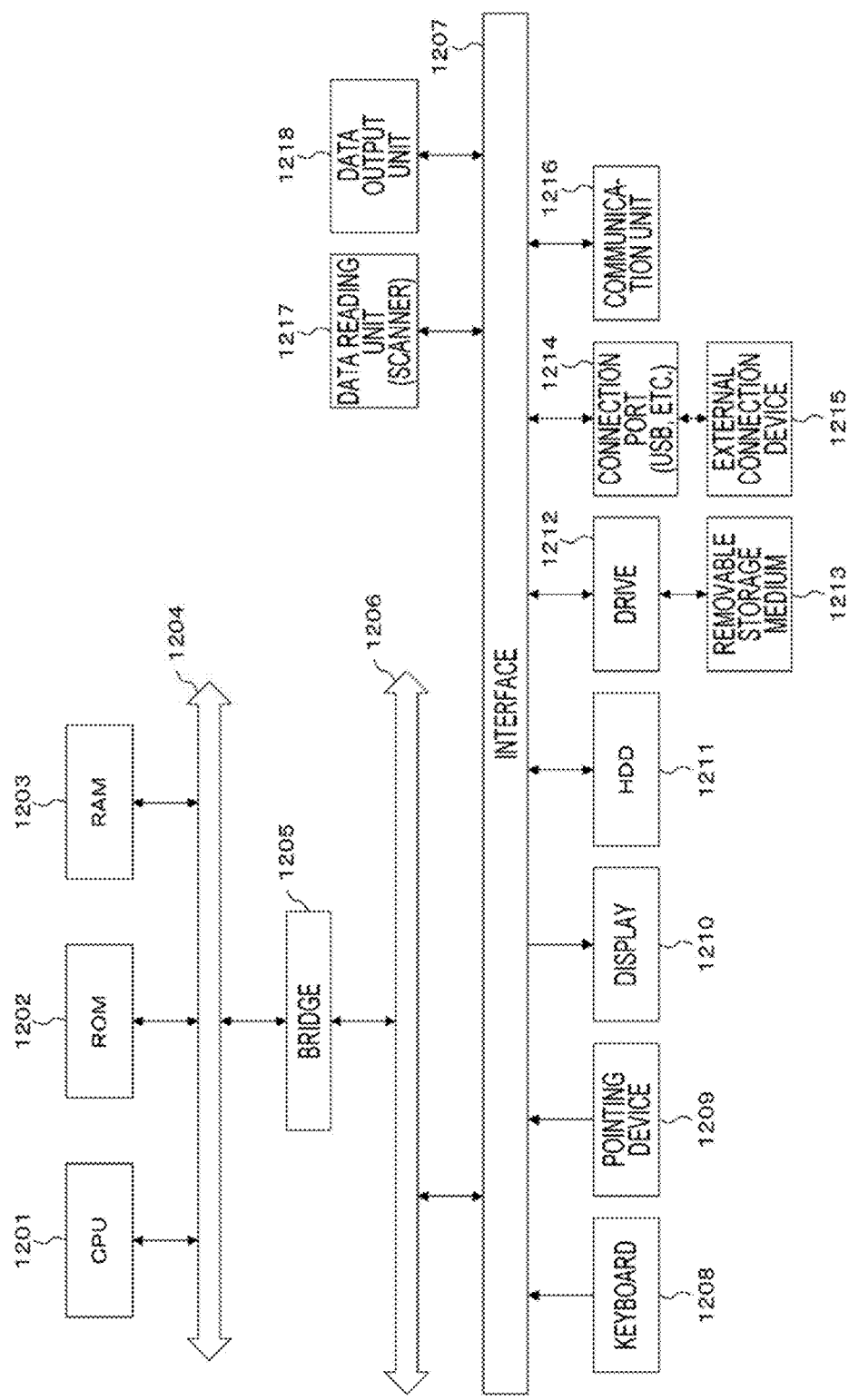
FIG. 12 is a block diagram illustrating an exemplary hardware configuration of a computer implementing the exemplary embodiment.

Further, while the example illustrated in FIG. 3 represents the configuration mainly serving as a chip using the ASIC or the like, the example illustrated in FIG. 12 mainly represents a functional configuration that is implemented with a personal computer or the like. For example, a CPU 1201 takes in charge of the functions of the SoC 300 and the ASIC 330.

The CPU 1201 is a controller that performs processes according to a computer program describing an execution sequence of each of the various modules described in the above-described exemplary embodiment, that is, the communication control module 110, the communication quality acquisition module 115, the switching determination module 120, the transmission method switching module 125, the channel switching module 130, the wireless communication module 135 and the like.

A read only memory (ROM) 1202 stores programs, operation parameters and the like used by the CPU 1201. A RAM 1203 stores programs used in the execution by the CPU 1201, parameters appropriately varying in the execution, and the like. These components are connected to each other by a host bus 1204 configured with a CPU bus or the like.

The host bus 1204 is connected to an external bus 1206 such as a peripheral component interconnect/interface (PCI) bus via a bridge 1205.

A keyboard 1208 and a pointing device 1209 such as a mouse are devices operated by an operator. A display 1210 is, for example, a liquid crystal display device or a cathode ray tube (CRT), and displays various types of information as texts and image information. In addition, a touch screen or the like having the functions of both the pointing device 1209 and the display 1210 may be used. In this case, the function of the keyboard may be implemented by drawing the keyboard using software (also called a so-called software keyboard, screen keyboard or the like) on the screen (the touch screen), without the physical connection as in the keyboard 1208.

A hard disk drive (HDD) 1211 is equipped with a hard disk (which may be a flash memory or the like) therein, drives the hard disk, and stores or plays programs or information executed by the CPU 1201. The hard disk stores the transmission method use table 700, the channel use table 900, the channel use table 1000, communication contents and the like. Further, in the hard disk, other various data and various computer programs are stored.

A drive 1212 reads data or programs stored in a removable storage medium 1213 such as a mounted magnetic disk, optical disc, magneto-optical disc, or semiconductor memory, and supplies the data or programs to the interface 1207, the external bus 1206, the bridge 1205, and the RAM 1203 connected via the host bus 1204. In addition, the removable storage medium 1213 may also be used as a data storing area.

A connection port 1214 is a port for connection of an external connection device 1215, and includes connection units such as USB and IEEE 1394. The connection port 1214 is connected to the CPU 1201 and the like via the interface 1207, the external bus 1206, the bridge 1205, the host bus 1204, and the like. A communication unit 1216 is connected to a communication line and performs a process of a data communication with an external device. A data reading unit 1217 is, for example, a scanner and performs a document reading process. A data output unit 1218 is, for example, a printer and performs a document data outputting process.

The hardware configuration of the information processing apparatus illustrated in FIG. 12 represents an exemplary configuration. The present exemplary embodiment is not limited to the configuration illustrated in FIG. 12, and may be any configuration that may execute the modules described in the present exemplary embodiment. For example, some of the modules may be configured with dedicated hardware (for example, application specific integrated circuit (ASIC)), and some of the modules maybe in the form in which the modules are present in an external system and are connected via a communication line. Further, the multiple systems illustrated in FIG. 12 may be connected to each other via a communication line and cooperate with each other. In addition, especially, the multiple systems of FIG. 12 may be incorporated in a personal computer, a portable information communication device (including a mobile phone, a smart phone, a mobile device, a wearable computer, and the like), an information appliance, a robot, a copying machine, a facsimile, a scanner, a printer, a multifunctional machine (an image processing apparatus having two or more functions of a scanner, a printer, a copying machine, a facsimile and, the like), and the like.

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, if the communication quality is not improved even by changing a transmission method, the channel may be switched to another channel. Here, specifically, the case where the "communication quality is not improved" corresponds to (i) a case where a difference between values of the communication quality before and after the transmission method switching is within a predetermined value or (ii) a case where the communication quality after switching between the transmission methods is worse than that before switching between the transmission methods.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs maybe transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs maybe divided and stored in multiple storage media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor programmed to:
      conduct a wireless communication using a plurality of transmission methods, at least one of which has a plurality of channels; and
      while conducting a communication using a respective one of the plurality of transmission methods and according to quality of the communication that is being conducted using the respective transmission method:
         determine if there is a qualifying one of the plurality of transmission methods that (i) is different from the respective transmission method and (ii) has not been previously used by the communication that is being conducted;
         in response to determining that there is the qualifying transmission method, switch the respective transmission method to the qualifying transmission method; and
         in response to determining that there is no qualifying transmission method, switch between channels of the respective transmission method.

2. The information processing apparatus according to claim 1, wherein the processor is programmed to:
   if a number of times of the switching to the qualifying transmission method is greater than or equal to a predetermined value, switch between the channels of the respective transmission method.

3. The information processing apparatus according to claim 1, wherein the plurality of the transmission methods include IEEE802.11ad.

4. The information processing apparatus according to claim 3, wherein
   the respective transmission method is switched to the qualifying transmission method which is IEEE802.11ad.

5. The information processing apparatus according to claim 1, wherein
   the respective transmission method is switched to the qualifying transmission method which is a predetermined transmission method with a predetermined channel.

6. The information processing apparatus according to claim 5, wherein the processor is programmed to:
   determine the predetermined transmission method and the predetermined channel at a time when the information processing apparatus is installed.

7. The information processing apparatus according to claim 1, further comprising:
   a memory that stores a first table that indicates whether each one of the plurality of transmission methods is currently in use or has been previously used by the communication that is being conducted.

8. The information processing apparatus according to claim 7, wherein
   the memory further stores a second table that indicates whether each one of the channels of the respective transmission method is currently in use or has been previously used by the communication that is being conducted.

9. A non-transitory computer readable storage medium storing an information processing program that, when executed, causes a computer to:
   conduct a wireless communication using a plurality of transmission methods, at least one of which has a plurality of channels; and
   while conducting a communication using a respective one of the plurality of transmission methods and according to quality of the communication that is being conducted using the respective transmission method:
      determine if there is a qualifying one of the plurality of transmission methods that (i) is different from the respective transmission method and (ii) has not been previously used by the communication that is being conducted;
      in response to determining that there is the qualifying transmission method, switch the respective transmission method to the qualifying transmission method; and
      in response to determining that there is no qualifying transmission method, switch between channels of the respective transmission method.

10. A method of communication for an information processing apparatus comprising:
    conducting a wireless communication using a plurality of transmission methods, at least one of which has a plurality of channels; and
    while conducting a communication using a respective one of the plurality of transmission methods and according to quality of the communication that is being conducted using the respective transmission method:

determining if there is a qualifying one of the plurality of transmission methods that (i) is different from the respective transmission method and (ii) has not been previously used by the communication that is being conducted;

in response to determining that there is the qualifying transmission method, switching the respective transmission method to the qualifying transmission method; and in response to determining that there is no qualifying transmission method, switching between channels of the respective transmission method.

* * * * *